US012654992B2

(12) United States Patent
Carparelli

(10) Patent No.: US 12,654,992 B2
(45) Date of Patent: Jun. 16, 2026

(54) AUTOMATICALLY CONTROLLED DOOR ASSEMBLY AS AN ELEVATOR LEVEL DOOR OF AN ELEVATOR SYSTEM

(71) Applicant: Inventio AG, Hergiswil (CH)

(72) Inventor: Donato Carparelli, Lugano (CH)

(73) Assignee: INVENTIO AG, Hergiswil (CH)

( * ) Notice: Subject to any disclaimer, the term of this patent is extended or adjusted under 35 U.S.C. 154(b) by 1247 days.

(21) Appl. No.: 17/310,834

(22) PCT Filed: Mar. 18, 2020

(86) PCT No.: PCT/EP2020/057441

§ 371 (c)(1),
(2) Date: Aug. 26, 2021

(87) PCT Pub. No.: WO2020/193311

PCT Pub. Date: Oct. 1, 2020

(65) Prior Publication Data

US 2022/0106167 A1 Apr. 7, 2022

(30) Foreign Application Priority Data

Mar. 28, 2019 (EP) .................................... 19165715

(51) Int. Cl.
*B66B 13/14* (2006.01)
*B66B 1/14* (2006.01)
(Continued)

(52) U.S. Cl.
CPC .............. *B66B 13/146* (2013.01); *B66B 1/14* (2013.01); *B66B 1/3446* (2013.01); *B66B 1/467* (2013.01);
(Continued)

(58) Field of Classification Search
CPC ....... B66B 13/146; B66B 1/14; B66B 1/3446; B66B 1/467; B66B 3/002; B66B 5/0012; B66B 13/30; B66B 2201/4638
(Continued)

(56) References Cited

U.S. PATENT DOCUMENTS 5,274,312 A * 12/1993 Gerstenkorn ........ G05B 19/232
318/617
2010/0234990 A1* 9/2010 Zini ..................... G05D 1/0255
700/245
(Continued)

FOREIGN PATENT DOCUMENTS

CN 103508277 B * 8/2015
CN 104968592 A * 10/2015 ............. B66B 1/468
(Continued)

*Primary Examiner* — Christina M Schreiber
(74) *Attorney, Agent, or Firm* — Shumaker, Loop & Kendrick, LLP

(57) ABSTRACT

An automatically controlled door arrangement, such as a floor door of an elevator installation, includes: at least one door leaf actively moveable between an open position and a closed position; a drive moving the door leaf between the open and closed positions; a controller controlling the drive; a sensor system detecting people or objects in front of the door leaf; and a data connection for data exchange with an external computer. The door arrangement receives and processes signals from the sensor system in the controller, sends query data to the external computer via the data connection based on the processed signals, receives instruction data from the external computer, and controls the door leaf drive taking into account the instruction data. The door arrangement provides monitorable, automated and, if possible, stepless access to buildings, for example, for robots, or receiving and storing delivered goods through the door arrangement.

17 Claims, 1 Drawing Sheet

9 DRIVE 11 CONTROLLER 15 TOUCH-SENSITIVE PANEL
17 CAMERA 21 COMPUTER

(51) Int. Cl.

| | |
|---|---|
| ***B66B 1/34*** | (2006.01) |
| ***B66B 1/46*** | (2006.01) |
| ***B66B 3/00*** | (2006.01) |
| ***B66B 5/00*** | (2006.01) |
| ***B66B 13/30*** | (2006.01) |

(52) U.S. Cl.
CPC ............ *B66B 3/002* (2013.01); *B66B 5/0012* (2013.01); *B66B 13/30* (2013.01); *B66B 2201/4638* (2013.01)

(58) Field of Classification Search
USPC .......................................................... 187/247
See application file for complete search history.

(56) References Cited

U.S. PATENT DOCUMENTS

| | | | | |
|---|---|---|---|---|
| 2011/0067958 | A1* | 3/2011 | Schuster | B66B 1/34 187/393 |
| 2012/0318616 | A1* | 12/2012 | Carparelli | B66B 11/0226 187/334 |
| 2016/0031675 | A1* | 2/2016 | Silvennoinen | B66B 1/468 700/275 |
| 2017/0175413 | A1* | 6/2017 | Curlander | B64F 1/025 |
| 2019/0193992 | A1* | 6/2019 | Studer | B66B 5/0025 |
| 2020/0071133 | A1* | 3/2020 | Kelly | G01V 8/10 |
| 2022/0106167 | A1* | 4/2022 | Carparelli | B66B 13/146 |
| 2022/0185625 | A1* | 6/2022 | One | G06N 3/0464 |
| 2023/0175307 | A1* | 6/2023 | Friedli | G07C 9/20 49/31 |

FOREIGN PATENT DOCUMENTS

| | | | | | |
|---|---|---|---|---|---|
| CN | 110733947 | A | * | 1/2020 | B66B 13/26 |
| CN | 110937477 | A | * | 3/2020 | B66B 1/3446 |
| CN | 111704013 | A | * | 9/2020 | G06V 40/10 |
| CN | 211419195 | U | * | 9/2020 | |
| CN | 115321310 | A | * | 11/2022 | B66B 3/008 |
| EP | 1345445 | A1 | * | 9/2003 | B66B 5/0012 |
| EP | 2392533 | A2 | * | 12/2011 | B66B 1/468 |
| EP | 3495300 | A1 | * | 6/2019 | B66B 1/468 |
| GB | 1238736 | A | * | 7/1971 | B66B 11/006 |
| JP | S6211886 | Y2 | * | 3/1987 | |
| JP | 2004299875 | A | * | 10/2004 | |
| JP | 2015107868 | A | * | 6/2015 | B66B 1/3476 |
| JP | 5790320 | B2 | * | 10/2015 | |
| JP | 2018083675 | A | * | 5/2018 | |
| JP | 2019210136 | A | * | 12/2019 | B66B 1/2408 |
| JP | 2019210137 | A | * | 12/2019 | B66B 3/002 |
| JP | 6641260 | B2 | * | 2/2020 | |
| WO | WO-2014067895 | A1 | * | 5/2014 | B66B 1/467 |
| WO | WO-2014122357 | A1 | * | 8/2014 | B66B 1/468 |
| WO | WO-2016185241 | A1 | * | 11/2016 | B66B 1/468 |
| WO | WO-2018071943 | A1 | * | 4/2018 | B66B 11/022 |
| WO | WO-2022207638 | A1 | * | 10/2022 | B66B 1/468 |
| WO | WO-2024104927 | A1 | * | 5/2024 | E05F 15/635 |

* cited by examiner

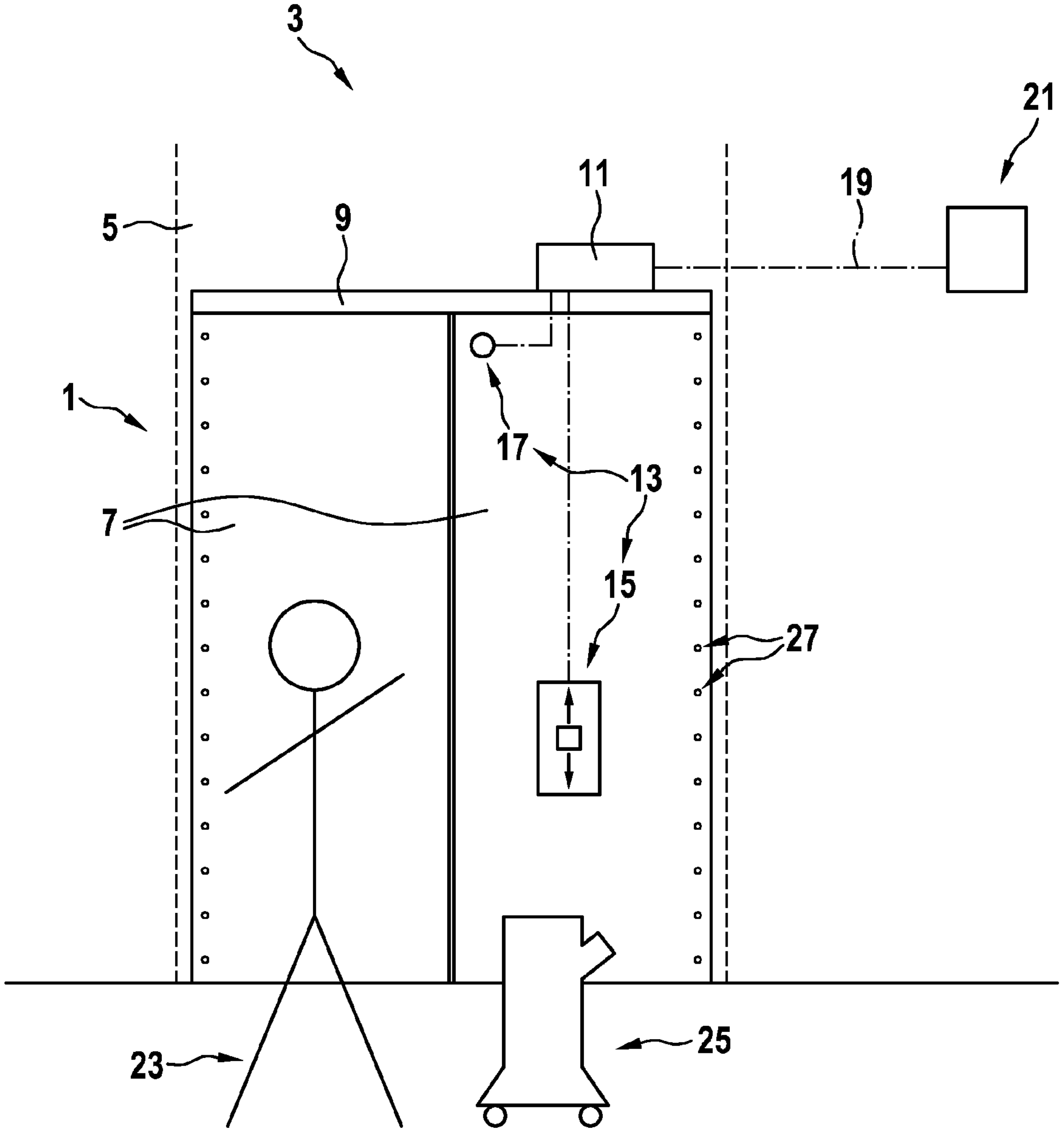
9 DRIVE 11 CONTROLLER 15 TOUCH-SENSITIVE PANEL
17 CAMERA 21 COMPUTER

AUTOMATICALLY CONTROLLED DOOR ASSEMBLY AS AN ELEVATOR LEVEL DOOR OF AN ELEVATOR SYSTEM

FIELD

The present invention relates to an automatically controlled door arrangement. Such a door arrangement can also be referred to as an autonomous, intelligent door arrangement. In particular, the invention relates to an automatically controlled floor door of an elevator installation and an elevator installation having such a floor door.

BACKGROUND

Elevator installations are used, for example, to make it possible to convey passengers between different floors within a building. An elevator car is usually moved vertically to the various floors within an elevator shaft.

The elevator car conventionally has car doors in which the door leaves can be actively opened and closed by a drive. The car doors including their drive are moved together with the elevator car. In addition, at least one floor door is provided on each of the floors that can block or enable access to the elevator shaft or to the elevator car held on the floor as required. Floor doors are conventionally passive, which means that they do not have their own drive to actively open one or more of their door leaves. Instead, the door leaves of the floor doors are moved together with the elevator car that is held on a floor when the car doors are opened or closed using its drive. As long as the elevator car does not stop on a floor, the door leaves of the floor door there are typically locked from opening.

It was recognized that for future applications, as will be described in more detail below, there may be a need for door arrangements to be used in particular as floor doors of an elevator installation, in which the door arrangement can actively open and close door leaves automatically and depending on the situation. Furthermore, there may be a need for an elevator installation with such a door arrangement.

SUMMARY

Such a need can be met by the subject matter according to any of the advantageous embodiments defined in the following description.

According to a first aspect of the invention, an automatically controlled door arrangement is proposed as a floor door of an elevator installation which has at least one door leaf, a drive, a controller, a sensor system and a data connection. The door leaf can be moved between an open and a closed position. The drive is configured to move the door leaf between the open and closed positions. The controller is configured to control the drive. The sensor system is configured to detect people or objects in front of the door leaf. The data connection is configured for data exchange with an external computer. The door arrangement is configured to carry out the following method steps, preferably, but not necessarily, in the specified order:

- receiving and processing signals from the sensor system in the controller;
- sending query data to the external computer via the data connection on the basis of the processed signals;
- then receiving instruction data provided by the external computer; and
- controlling the drive of the door leaf taking into account the instruction data.

According to a third aspect of the invention, an elevator installation having an automatically controlled door arrangement according to an embodiment of the first aspect is proposed.

Possible features and advantages of embodiments of the invention can be considered, among others and without limiting the invention, to be based upon the concepts and findings described below.

As already indicated in the introduction, it can be useful for future applications if a door arrangement is able to actively open and close its door leaves automatically and depending on the situation. In particular for floor doors of an elevator installation, the ability to be able to actively open or close door leaves depending on a currently recognized need can enable new fields of application.

For example, it has hitherto been assumed that a floor door of an elevator installation should only be opened when the elevator car stops at the floor in question. It was assumed that in an elevator installation that is intended to transport people, a car door must always be provided on the elevator car for safety reasons and that both the car door and the floor door are opened in order to enable access from one floor to the elevator car. In order to minimize a number of necessary door drives, only the car door is usually provided with an active drive and the floor door in front of which the elevator car stops is coupled to the car door and passively opened by it.

It was also assumed that the floor door is directly adjacent to the elevator shaft and thus, in the event that the floor door opens and there is no elevator car behind it, there would be a risk that people could step through the floor door and fall into the open elevator shaft.

In order to be able to open up new fields of application, however, it can be helpful to reconsider or further develop the previously mentioned assumptions.

As a new application, in the future, for example, it could be possible to use an elevator installation not only for transporting people but also for transporting robots or the like. It is even conceivable to provide elevator installations exclusively for the transport of robots in order to enable them to move freely within a building. In this case, the safety precautions to be observed by the elevator installation can be significantly more relaxed than with elevator installations with which people are to be transported. For example, it may be acceptable to dispense with a car door. Instead, it is possible to restrict access to the elevator car with only floor doors. In this case, the floor doors should have an active drive. Furthermore, the floor doors should be able to recognize when they should open the door leaves and when the door leaves should be closed. In particular, it would be advantageous if a floor door could recognize when a passenger in the form of a human or a robot is waiting in front of the floor door. In the ideal case, the floor door should even be able to determine the type of passenger, i.e. human or robot, or even features which make it possible for conclusions to be drawn about their identity.

Another new application could be provided in the future, for example, to provide elevator installations for receiving and transporting goods. There is currently a trend towards buying more and more goods over the Internet and then having them delivered. Various problems can arise during delivery. For example, a person who could accept the delivery may not be present at the delivery address. In the case of delivery addresses that are within a high-rise building, it may also be necessary for a supplier to have to cover long distances within the building. In addition, it is possible that future deliveries will no longer be made by people but by robots or drones. The problems mentioned are sometimes referred to as "last mile" challenges. By using an automatically controlled door arrangement, for example, a supplier in the form of a human or a robot waiting in front of the door arrangement could be recognized and the door leaves opened automatically. It would be advantageous to be able to determine features that make it possible to make conclusions about a property, an identity or an authorization of the supplier in order to be able to decide whether access to part of a building behind it should be granted by opening the door arrangement. The part of the building behind it can optionally be part of an elevator installation, i.e. the door arrangement is a floor door of the elevator installation such that, for example, a supplier can deliver goods directly to a specially provided elevator installation. Using the elevator installation, the goods can then be delivered to a desired floor within the building.

In order to make such or similar new fields of application possible, embodiments of an automatically controlled door arrangement, which can be used as a floor door of an elevator installation, are proposed according to the first aspect of the invention.

Like conventional floor doors, this door arrangement should have at least one door leaf, possibly also a plurality of door leaves, which can be moved between an open and a closed position. Typically, the door leaves are moved linearly for this purpose.

In contrast to conventional floor doors, the door arrangement should also have a drive, by means of which the door leaf or the door leaves can be actively moved between the open and the closed position. Such a drive can, for example, have an electric motor which interacts with the door leaf via a mechanism so that the door leaf is suitably moved when the electric motor is operated. Other drives such as hydraulic drives, pneumatic drives or the like are also conceivable.

The door arrangement should also have a controller by means of which the drive can be controlled. The controller can, for example, control a power supply to the drive.

Furthermore, the door arrangement should have its own sensor system. The sensor system should be configured to detect people or objects such as robots that are located in front of the door leaf and are waiting there, for example, to be admitted. Possible configurations of such a sensor system are discussed further below.

Finally, the door arrangement should also have a data connection via which data can be exchanged between the door arrangement and an external computer. The external computer need not be part of the door arrangement. The external computer can be a processor-controlled controller of the elevator installation, for example. In this case, the external computer can be located in the same building as the door arrangement. The external computer can, however, also be located outside the building and, for example, be a data server or part of a data cloud.

The door arrangement and its components should be configured to transmit signals which are supplied by the sensor system to the controller and to process them in the controller. Such signals can, for example, make it possible to draw conclusions about the people or objects detected by the sensor systems in front of the door leaf, or actions carried out by them. By processing these signals, data can be generated; these data are referred to herein as query data. These query data can then be sent to the external computer via the data connection. The external computer can have computing power and/or access to further data which make it possible to draw conclusions from the query data received about whether the door leaves of the door arrangement are currently to be opened or closed. On the basis of these inferences, the external computer can generate further data which are referred to herein as instruction data. The external computer can then send this instruction data back to the door arrangement. Taking into account this received instruction data, the drive of the door leaf can then be controlled by the controller of the door arrangement.

Such a design of the door arrangement makes it possible to provide the door arrangement with a kind of intelligence which enables the door arrangement to open and close its door leaves actively, automatically and as required, i.e. autonomously. The door arrangement can therefore also be referred to as an autonomous smart door. Using its sensor systems, the door arrangement can not only recognize that there is a person or an object in front of the door leaf, but can also process signals supplied by the sensor systems and then forward them as query data to the external computer such that the external computer can then carry out further analyzes of the preprocessed signals supplied by the sensor system and ultimately cause the door arrangement to open or close its door leaves by transmitting instruction data appropriate to the situation.

In other words, the door arrangement can have an optimized user interface (UI) from people to machines (human-machine) or from machines to machines (machine-machine), thereby ensuring a safe mode of operation.

Such a door arrangement is used as a floor door of a special elevator installation, by means of which, for example, robots, drones or goods delivered by them are also or even exclusively to be transported. After the door arrangement has detected the presence and preferably also an identity or authorization of a robot, drone or goods waiting in front of its door leaf by using the intelligence available to it due to its sensor technology and data processing options, it can open the door leaf as required and thus access, for example, to a enable the elevator car waiting behind. A storage room can possibly also initially be provided behind the door arrangement, in which room goods can be temporarily stored or a robot or drone can wait.

According to an embodiment, the sensor system is configured to interact with the people or objects in front of the door leaf.

In other words, the sensor system can be designed to output information to people or objects such as, for example, robots which are located in front of the door leaf of the door arrangement, and/or to receive information entered by them.

Output information can provide information about a current state of the door arrangement itself or an elevator installation that is closed by the door arrangement or a room located behind the door arrangement. For example, information can be provided as to whether the door arrangement is currently locked, whether there is currently a waiting elevator car behind the door arrangement or whether the space behind the door arrangement is free or already occupied.

Information entered can contain information about the waiting passenger or object, for example. For example, the information entered can indicate an authorization of the passenger or object or an identity thereof. Furthermore, the information entered can indicate that the passenger or object wishes to be admitted through the door arrangement and/or optionally would like to be driven to a desired floor by an elevator installation located behind it.

For example, according to an embodiment, the sensor system can have a touch-sensitive panel. A panel of this kind can recognize when it is touched by a person or a robot and then generate a signal. The panel can act like a button or switch. Optionally, the panel can recognize the position where it is touched and then generate a position-dependent signal.

In particular, the sensor system can have a touch-sensitive screen. Such a screen can display information visually. If the screen is touched at a position on its surface, it can receive information depending on the position. As a sensor system in an automatically controlled floor door, such a screen can, for example, indicate whether an elevator car is currently waiting behind the floor door, whether the elevator car is empty or already fully occupied, where the elevator car is going next, etc. By touching the screen, it can be indicated, for example, that the door arrangement is to be opened wherever a passenger wishes to go using the elevator car and/or which person is to be informed about a delivered product stored in the elevator car.

Furthermore, according to an embodiment, the sensor system can have a camera. A camera can record an image of the surroundings of the door arrangement, in particular of a region in front of the door leaf. The camera can then forward corresponding image signals to the controller. From the image signals it can be deduced whether a person or an object is in front of the door leaf. Furthermore, a property or even an identity of the passenger or object can possibly be inferred by suitable analysis of the image signals. It may even be possible to deduce from the image signals whether, for example, a passenger or robot is authorized to enter a building or an elevator installation through the door arrangement.

In a more specific embodiment, the controller can be configured to process signals from the camera in order to recognize gestures of a person in front of the door leaf. In other words, camera signals recorded one after the other can be analyzed to determine whether movements can be recognized therein that are to be interpreted as gestures carried out by a person. A passenger can use such gesture recognition to transmit instructions to the door arrangement in an intuitive manner. For example, it is possible to signal that the door should be opened, that an elevator car should be called, or the like.

According to an embodiment, the sensor system can be integrated into the door leaf. The sensor system can thus be elegantly and/or appropriately integrated into the door arrangement. In particular, no additional components, such as a door frame or the like, need to be provided to accommodate the sensor system.

For example, the touch-sensitive panel or the touch-sensitive screen described above can be integrated directly into the door leaf. In particular, the panel or the screen can be attached at a position or at a height at which they can easily be operated manually by a passenger. The camera described above can also be integrated directly into the door leaf. For example, the camera can be recorded near an upper edge of the door leaf in order to be able to obtain a good overview of the region in front of the door leaf.

According to an embodiment, the door arrangement as a floor door of an elevator installation can furthermore have one or more light emitters which are configured to signal the arrival of an elevator car at the door arrangement. The light emitters can be light emitting diodes (LEDs), for example. The light emitters can preferably be integrated directly into the door leaf. Using the light emitters, for example, the arrival of the elevator car at the door arrangement can be signaled in a simple manner that is intuitively perceptible to a passenger.

According to an embodiment, the light emitter(s) can be configured to signal a current occupancy state of the elevator car. For example, weight sensors and/or optical sensors can be used to detect whether the elevator car is empty, half-occupied or fully occupied. The current occupancy status can then be signaled by using the light emitters, for example by emitting light of a specific color or outputting light signals in a specific time sequence.

According to an embodiment, the sensor system and the controller are configured to communicate wirelessly with one another. In particular, if the sensor system is accommodated in the door leaf and the controller is located outside the door leaf, this can simplify the transmission of signals between these two components. In particular, no electrical line needs to be laid between these two components which are to be moved relative to one another.

According to a further embodiment, the controller can furthermore be configured to communicate wirelessly with the external computer. This makes it possible for the data connection between the controller and the external computer to be established in a simple manner without, for example, the need to lay electrical lines. Depending on whether the external computer is arranged relatively close to the control, for example, is located in the same building, or whether the external computer is arranged far away from the control, different technologies can be used for wireless communication. For example, a local radio network (e.g. WLAN/WiFi) can be used at short distances.

According to an embodiment, the door arrangement can be designed without a frame. Such a frameless door arrangement can be easy to integrate into a building. The frameless door arrangement also meets high aesthetic demands.

An elevator installation equipped with an embodiment of the door arrangement described herein can use the “intelligence” available to the door arrangement in order to cope with new applications.

For example, it can be recognized via the sensor system of the door arrangement that a person, a robot or a drone is standing in front of the door leaf and waiting to be admitted. This information can be sent to the external computer via the data connection. Criteria could have been programmed into the external computer beforehand, on the basis of which the computer can judge whether the door arrangement should be opened and thus entry allowed.

If necessary, the external computer can also inform a user, for example a house or apartment owner, about the presence of the person, the robot or the drone via a network so that the user can instruct whether the door arrangement should be opened. For example, the external computer can forward an image recorded by the camera, which is part of the sensor system, to a smartphone via a network so that the user of the smartphone can judge, on the basis of the image information, whether a person waiting in front of the door leaf is authorized to enter through the door arrangement or to use the elevator installation.

It must be noted that some of the possible features and advantages of the invention are described herein with reference to different embodiments of the door arrangement and the elevator installation. A person skilled in the art recognizes that the features can be combined, transferred, adapted, or replaced in a suitable manner in order to arrive at further embodiments of the invention.

Embodiments of the invention will be described below with reference to the accompanying drawings, with neither the drawings nor the description being intended to be interpreted as limiting the invention.

DESCRIPTION OF THE DRAWINGS

FIG. 1 shows a door arrangement according to an embodiment of the present invention.

The FIGURE is merely schematic and not to scale.

DETAILED DESCRIPTION

FIG. 1 shows an automatically controlled door arrangement 1 according to an embodiment of the present invention. The door arrangement 1 is designed as a floor door of an elevator installation 3 and forms an access to an elevator shaft 5 of the elevator installation 3. The door arrangement 1 can be designed without a frame.

The door arrangement 1 has two door leaves 7 which can be moved in opposite directions in order to be moved between an open and a closed position. The door leaves 7 are moved by a drive 9. The drive 9 is controlled by a controller 11.

The door arrangement 1 also has a sensor system 13 by means of which people 23 or objects 25 such as, for example, robots can be detected in front of the door leaves 7 and can optionally be interacted with. In the example shown, the sensor system 13 comprises a touch-sensitive panel 15 and a camera 17. Both the touch-sensitive panel 15 and the camera 17 are integrated into one of the door leaves 7.

The sensor system 13 or its touch-sensitive panel 15 and its camera 17 can exchange signals with the controller 11, preferably via a wireless connection (as shown in the FIGURE by dash-dotted lines).

The controller 11 can exchange data with an external computer 21 via a data connection 19. This data connection 19 can also be wireless (as shown in the FIGURE again by a dash-dotted line), i.e. the controller 11 can, for example, have a wireless data interface in the form of a radio module in order to be able to communicate with the external computer 21.

The door arrangement 1 also has a plurality of light emitters 27, for example in the form of LEDs, which are also integrated in one or both of the door leaves 7. In the example shown, the light emitters 27 are arranged equidistant from one another along a vertical line parallel to the outer edges of the door leaves 7.

When the person 23 or the robot approaches the door arrangement 1, this can be detected using the camera 17, for example. The person 23 can possibly signal by means of a gesture that they wish to open the door arrangement 1. The gesture can be recorded using the camera 17 and corresponding image data can be processed by the controller 11 in order to recognize the gesture. Alternatively, the person 23 can operate the touch-sensitive panel 15 to indicate their wish. In a similar way, the robot could, for example, send out a light signal or make a movement that can be recognized as a gesture by the sensor system 13 and the controller 11.

The light emitters 27 can be used to signal the current state of the door arrangement 1 or the elevator installation 3 locked by the door arrangement 1. For example, an occupancy state of an elevator car waiting behind the door arrangement 1 can be visualized.

After the signals generated by the sensor system 13 have been suitably preprocessed in the controller 11, the controller 11 can send query data based thereon to the external computer 21 via the data connection 19. The external computer 21 can further process these query data. For example, the external computer 21 can determine, by comparison with data in a database accessible by the computer, whether the person 23 or the robot should be authorized to open the door arrangement 1. If necessary, the external computer 21 can establish contact with another computer or a system administrator, for example via a network, in order to clarify whether the person 23 or the robot may open the door arrangement 1.

The external computer 21 can then send corresponding instruction data back to the door arrangement 1, in particular to its controller 11, via the data connection 19. Finally, the controller 11 can then control the drive 9 according to the instruction data in order to open or close the door leaves 7.

The door arrangement 1 makes new fields of application possible such as, for example, monitorable, automated and, if possible, stepless access to buildings, for example for robots, or the acceptance and storage of delivered goods through the door arrangement 1.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An automatically controlled door arrangement used as a floor door of an elevator installation, the door arrangement comprising:

- a door leaf actively moveable between an open position and a closed position independent from an elevator car of the elevator installation;
- a drive disposed within the door arrangement adapted to move the door leaf between the open position and the closed position;
- a door arrangement controller configured to control the drive of the door arrangement;
- a sensor system detecting people and/or objects in front of the door leaf, the sensor system being integrated into the door leaf;
- a data connection for data exchange between the door arrangement controller and an external computer; and
- wherein the door arrangement receives and processes signals from the sensor system in the door arrangement controller, sends query data to the external computer via the data connection based upon the processed signals, receives instruction data provided by the external computer in response to the query data, and controls the drive to operate the door leaf in response to the instruction data.

2. The door arrangement according to claim 1 wherein the sensor system interacts with the people and/or objects detected in front of the door leaf.

3. The door arrangement according to claim 1 wherein the sensor system includes a touch-sensitive panel that exchanges signals with the door arrangement controller.

4. The door arrangement according to claim 1 wherein the sensor system includes a touch-sensitive screen for displaying information received from the door arrangement controller.

5. The door arrangement according to claim 1 wherein the sensor system includes a camera for detecting the people and/or objects in front of the door leaf.

6. The door arrangement according to claim 5 wherein the door arrangement controller processes signals from the camera to recognize one or more gestures of a person detected in front of the door leaf, wherein the one or more gestures correspond to a particular elevator command.

7. The door arrangement according to claim 1 including at least one light emitter that signals an arrival of the elevator car at the door arrangement, the at least one light emitter being integrated into the door leaf.

8. The door arrangement according to claim 7 wherein the at least one light emitter signals a current occupancy state of the elevator car.

9. The door arrangement according to claim 7 including a plurality of the light emitter integrated into the door leaf arranged along a vertical line parallel to an outer edge of the door leaf.

10. The door arrangement according to claim 1 wherein the sensor system and the door arrangement controller communicate wirelessly with one another.

11. The door arrangement according to claim 1 wherein the door arrangement controller communicates wirelessly with the external computer.

12. The door arrangement according to claim 1 wherein the door arrangement is frameless.

13. An elevator installation comprising:

an elevator shaft; and the automatically controlled door arrangement according to claim 1 providing controlled access to the elevator shaft.

14. An automatically controlled door arrangement providing access to an elevator shaft of an elevator installation, the door arrangement comprising:

a door leaf actively moveable between an open position and a closed position independent of an elevator car of the elevator installation;

a drive disposed within the door arrangement adapted to move the door leaf between the open position and the closed position;

a door arrangement controller configured to control the drive of the door arrangement;

a sensor system detecting people and/or objects in front of the door leaf, wherein the sensor system interacts with the people and/or objects detected in front of the door leaf, the sensor system being integrated into the door leaf, and wherein the sensor system includes a touch-sensitive panel that exchanges signals with the door arrangement controller and displays information received from the door arrangement controller;

a data connection for data exchange between the door arrangement controller and an external computer; and wherein the door arrangement receives and processes signals from the sensor system in the door arrangement controller, sends query data to the external computer via the data connection based upon the processed signals, receives instruction data provided by the external computer in response to the query data, and controls the drive to operate the door leaf in response to the instruction data.

15. The door arrangement according to claim 14 wherein the sensor system includes a camera for detecting the people and/or objects in front of the door leaf and the door arrangement controller processes signals from the camera to recognize one or more gestures of a person detected in front of the door leaf, wherein the one or more gestures correspond to a particular elevator command.

16. The door arrangement according to claim 14 including a plurality of light emitters integrated into the door leaf, the light emitters signaling at least one of an arrival of the elevator car at the door arrangement and a current occupancy state of the elevator car arriving at the door arrangement.

17. An automatically controlled door arrangement used as a floor door of an elevator installation, the door arrangement comprising:

a door leaf actively moveable between an open position and a closed position independent of an elevator car of the elevator installation;

a drive disposed within the door arrangement adapted to move the door leaf between the open position and the closed position;

a door arrangement controller configured to control the drive of the door arrangement;

a sensor system detecting people and/or objects in front of the door leaf, the sensor system being integrated into the door leaf;

the sensor system including a touch-sensitive panel that exchanges signals with the door arrangement controller and displays information received from the door arrangement controller;

the sensor system including a camera for detecting the people and/or objects in front of the door leaf, wherein the door arrangement controller processes signals from the camera to recognize one or more gestures of a person detected in front of the door leaf, wherein the one or more gestures correspond to a particular elevator command;

a data connection for data exchange between the door arrangement controller and an external computer; and wherein the door arrangement receives and processes signals from the sensor system in the door arrangement controller, sends query data to the external computer via the data connection based upon the processed signals, receives instruction data provided by the external computer in response to the query data, and controls the drive to operate the door leaf in response to the instruction data.

* * * * *